US010194290B2

(12) United States Patent
Liu

(10) Patent No.: US 10,194,290 B2
(45) Date of Patent: *Jan. 29, 2019

(54) ENERGY-EFFICIENT PUSH/POLL NOTIFICATION SERVICE

(71) Applicant: T-Mobile USA, Inc., Bellevue, WA (US)

(72) Inventor: Chunming Liu, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/794,795

(22) Filed: Oct. 26, 2017

(65) Prior Publication Data

US 2018/0049007 A1 Feb. 15, 2018

Related U.S. Application Data

(63) Continuation of application No. 13/706,189, filed on Dec. 5, 2012, now Pat. No. 9,832,623.

(51) Int. Cl.
*H04W 52/02* (2009.01)
*H04W 4/20* (2018.01)

(52) U.S. Cl.
CPC ............. *H04W 4/20* (2013.01); *H04W 52/02* (2013.01); *H04W 52/0222* (2013.01);
(Continued)

(58) Field of Classification Search
CPC ............. H04W 52/02; H04W 52/0216; H04W 52/0219; H04W 52/0241; H04W 4/20;
(Continued)

(56) References Cited

U.S. PATENT DOCUMENTS

| 7,689,223 B1* | 3/2010 | Lewis | H04W 76/10 455/445 |
| 7,975,063 B2* | 7/2011 | Lefebvre | H04N 21/23805 370/231 |

(Continued)

OTHER PUBLICATIONS

Office action for U.S. Appl. No. 13/706,189, dated Dec. 30, 2016, Liu, "Energy-Efficient Push/Poll Notification Service", 44 pages.
(Continued)

*Primary Examiner* — Andrew W Chriss
*Assistant Examiner* — Rasha Fayed
(74) *Attorney, Agent, or Firm* — Lee & Hayes, P.C.

(57) ABSTRACT

Techniques for energy efficient notification services are described. A telecommunications device may acquire multimedia/notification service data from various upstream units, e.g., one or more multimedia/notification service servers, at least one push notification service server and/or a storage system. The telecommunications device may select a communication channel between the telecommunications device and the various upstream units for acquiring multimedia/notification service data. The telecommunications device may select the communications channel based at least in part on efficiencies, e.g., it may select the most energy efficient communications channel. The telecommunications device may, in some instances, acquire the multimedia/notification service data as pushes from one or more upstream units (e.g., a push notification service server), and may, in some instances, acquire the multimedia/notification service data as pulls from one or more upstream units (e.g., one or more multimedia/notification service servers and/or a storage system).

20 Claims, 7 Drawing Sheets

(52) U.S. Cl.
CPC .......... *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/23* (2018.01)

(58) Field of Classification Search
CPC ....... H04L 67/04; H04L 67/14; H04L 67/145; H04L 67/1095
USPC .................. 370/311, 328; 709/223, 224, 225
See application file for complete search history.

(56) References Cited

U.S. PATENT DOCUMENTS

| | | | |
|---|---|---|---|
| 2005/0130694 A1* | 6/2005 | Medvedev ........... | H04B 7/0417 455/522 |
| 2005/0169202 A1* | 8/2005 | Ratasuk .............. | H04W 52/327 370/312 |
| 2006/0205408 A1* | 9/2006 | Nakagawa ........... | H04W 88/02 455/445 |
| 2007/0211666 A1* | 9/2007 | Sung .................... | H04B 7/0697 370/334 |
| 2009/0124300 A1 | 5/2009 | Park et al. | |
| 2009/0240825 A1 | 9/2009 | Berkvens et al. | |
| 2009/0264103 A1* | 10/2009 | Chen ................. | H04L 29/06027 455/411 |
| 2010/0054144 A1* | 3/2010 | Choi .................... | H04L 1/0003 370/252 |
| 2011/0131321 A1* | 6/2011 | Black .................... | G06F 1/3203 709/224 |
| 2011/0149844 A1* | 6/2011 | G .......................... | H04L 45/122 370/328 |
| 2011/0165865 A1* | 7/2011 | Gao .................... | H04W 72/005 455/414.1 |
| 2012/0020577 A1* | 1/2012 | Yasrebi .................. | H04L 51/34 382/229 |
| 2012/0083211 A1* | 4/2012 | Jeon .................... | H04B 17/0045 455/41.2 |
| 2012/0287803 A1* | 11/2012 | Niu ...................... | H04L 25/0204 370/252 |
| 2013/0181839 A1* | 7/2013 | Cao ...................... | G06Q 10/087 340/572.1 |
| 2014/0149751 A1* | 5/2014 | Baysah ................... | G06F 1/206 713/300 |
| 2014/0153457 A1 | 6/2014 | Liu | |

OTHER PUBLICATIONS

Office action for U.S. Appl. No. 13/706,189, dated Feb. 24, 2016, Liu, "Energy-Efficient Push/Poll Notification Service", 41 pages.
Office action for U.S. Appl. No. 13/706,189, dated Feb. 26, 2015, Liu, "Energy-Efficient Push/Poll Notification Service", 42 pages.
Office action for U.S. Appl. No. 13/706,189, dated Jul. 18, 2017, Liu, "Energy-Efficient Push/Poll Notification Service",42 pages.
Office action for U.S. Appl. No. 13/706,189, dated Jul. 29, 2014, Liu, "Energy-Efficient Push/Poll Notification Service", 38 pages.
Office Action for U.S. Appl. No. 13/706,189, dated Jul. 9, 2015, Chunming Liu, "Energy-Efficient Push/Poll Notification Service", 46 pages.
The PCT Search Report and Written Opinion dated Mar. 26, 2014 for PCT application No. PCT/US13/71621, 11 pages.

* cited by examiner

ENERGY-EFFICIENT PUSH/POLL NOTIFICATION SERVICE

CROSS REFERENCE TO RELATED APPLICATIONS

This is a continuation application which claims priority to commonly assigned, co-pending U.S. patent application Ser. No. 13/706,189, filed Dec. 5, 2012. application Ser. No. 13/706,189 is fully incorporated herein by reference

BACKGROUND

Over the past thirty years, telephony has significantly evolved from the once-ubiquitous public switched telephone service (PSTN). Telecommunications consumers today have a wide range of telecommunications options to choose from, including traditional landline phone service, IP-based telecommunications services (based on, for example, Voice over Internet Protocol), cellular telecommunications services, and converged telecommunications services (such as Unlicensed Mobile Access or UMA).

Telecommunications devices now consist in a myriad of form factors, such as traditional landline phones, cordless phones, cellular phones, smart phones, personal digital assistant (PDA) phones, desktop and portable computers, media players, home telecommunications hubs, or the like (hereinafter "telecommunications devices"), which have become a ubiquitous part of modern life. Originally, most of these telecommunications devices just provided two-way voice communication between a first person at a first location using a first telecommunication device and a second person at a second location using a second telecommunication device, so that the first person and the second person were able to carry on a conversation. For example, a voice communication or call normally involved real-time, duplex, synchronous voice communications, in which all participants hear the other participants in real time, all participants can simultaneously speak, and all participants are actively engaged and respond directly and immediately to each other without significant interruption.

More recently, telecommunication devices are frequently capable of both voice and data communications, using various modes of such communications. Instant messaging (IM) is a form of synchronous communication in which data may be exchanged between participants. Email, text messages (e.g., Short Message Service or SMS), and multimedia messages (e.g., Multimedia Messaging Service or MIMS) are well-known forms of asynchronous data communications. Email was originally used with computers, but is now commonly sent and received through telecommunications devices as well. SMS text messaging has been used for many years in the area of cellular telecommunications. Participants are typically engaged in the communications at different times, and their participation might occur as a number of small, non-contiguous, asynchronous interactions.

In addition to person-to-person communications, many modern telecommunications devices are capable of other types of data communications through access to the Internet and other databases. For example, many telecommunication devices have built-in web browsers for Internet navigation.

It should be noted that both voice and data communications might be implemented using the same wireless and IP-based technologies. In some situations, particularly with conventional cellular or IP-based systems, voice might be communicated using a proprietary cellular protocol, while data and non-voice communications are based on other protocols carried over a cellular and/or an IP-based telecommunications network.

Telecommunications devices vary in complexity and capabilities, from simple devices that support only voice communications, to very sophisticated devices with capabilities of personal computers. For example, telecommunications devices may employ operating systems that have features (e.g., tiles) that utilize notifications and may execute applications (e.g., e-mail, WI) that utilize or consume notifications. These very sophisticated devices, however, consume more power than telecommunications devices have historically consumed, leading to usability issues as consumers are often confronted with low battery warnings and non-functional devices.

TELECOMMUNICATIONS BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to systems and methods for enabling telecommunications devices to select a communications channel for obtaining multimedia and/or notifications, e.g., notification service data. The telecommunications device may employ an operating system having features such as "tiles" that utilize notifications and/or may execute applications that utilize notifications. The telecommunications device may determine whether to receive data, e.g., multimedia and/or notification service data, from a push multimedia/notification service server or to poll and if necessary, pull the notifications from an upstream unit such as a storage system and/or from one or more multimedia/notification service servers.

The systems and methods described in this disclosure provide ways for a telecommunications device to initiate a push/poll notification session and to manage the push/poll notification session so as to reduce/minimize energy consumption by the telecommunications device.

In some embodiments, notification service data and other multi-media data may be delivered through a push/poll notification session.

In some embodiments, a storage system may be employed to store multimedia/notification service data (including multimedia services data). The storage system may overcome poor quality of service (QoS) in a static channel and high latency in Internet data transmission.

In some embodiments, a storage system may include a cloud based storage system to distribute service globally, instead of distributing push notification service servers geographically. In some instances, the cloud based storage system may utilize its own specific fiber connections between different data centers, and accordingly, the data exchange and transmission inside cloud based storage system may be much faster than common Internet.

In some embodiments, while the telecommunications device roams, the telecommunications device may check nearby possible storage service available for telecommunications device, and compare power efficiency and QoS metrics of using a persistent Push Session to that of polling web service from a cloud based storage system and/or from one or more notification servers. The telecommunications device may employ algorithms to select a service scheme, e.g., push or polling, with minimum power consumption.

The systems and methods described herein may be implemented in a number of ways. Example implementations are provided below with reference to the following figures.

Example Network Architecture

Figure 1:
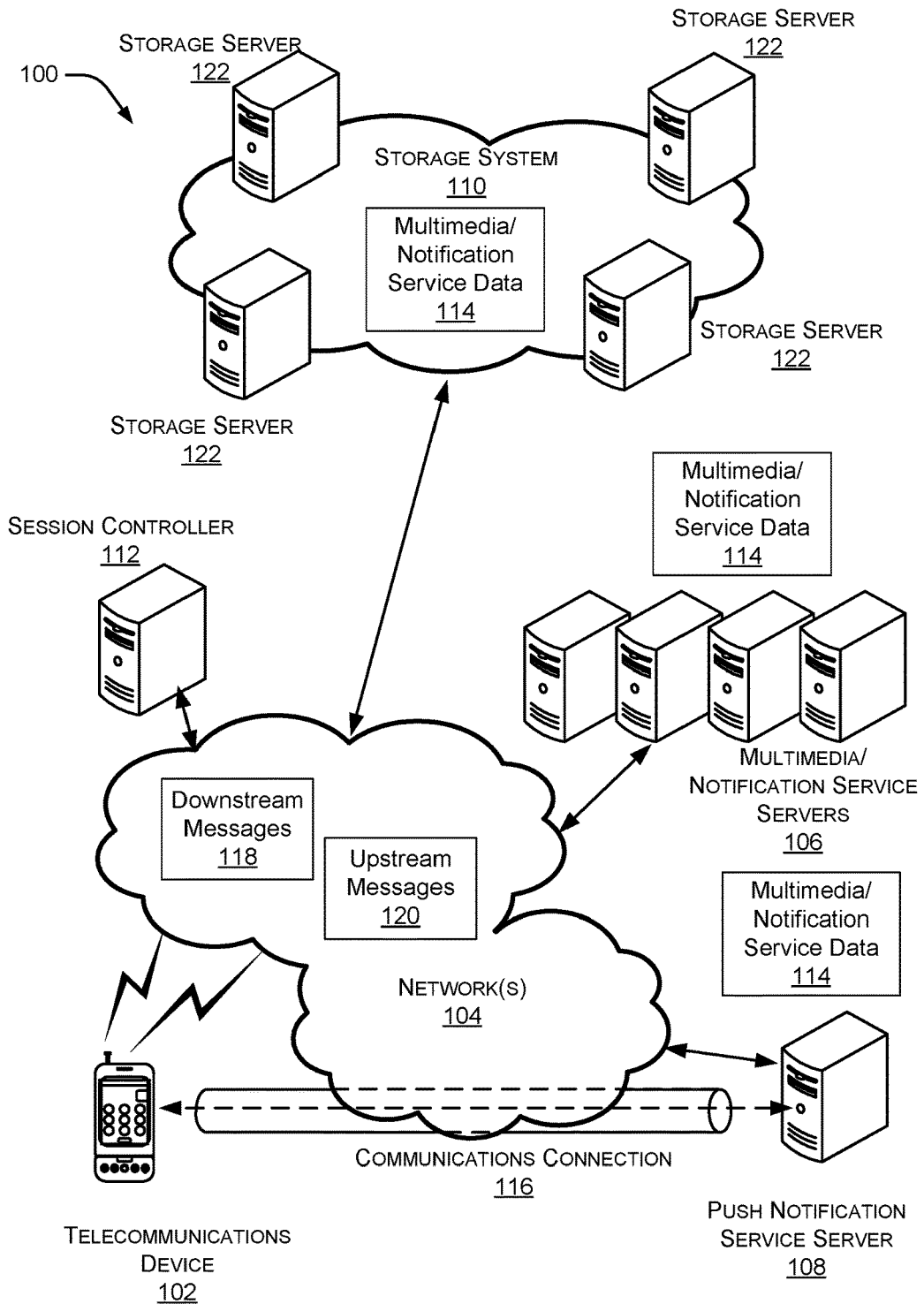
FIG. 1 illustrates an example network architecture that includes a telecommunications device configured to switch between push/poll notification channels and elements of a telecommunications network to which the telecommunications device is coupled.

FIG. 1 illustrates an exemplary network architecture 100 for implementing power efficient push/poll multimedia/notification service(s). The exemplary architecture 100 shows, telecommunications device 102, network(s) 104, multimedia/notification service servers 106, push notification service server 108, storage system 110 and session controller 112.

The telecommunications device 102 may be executing one or more applications and/or an operating system (e.g., e-mail, instant messaging, tiles, social network(s) updates, etc.) that utilize notifications. The telecommunications device 102 is capable of connecting to the networks 104 and of receiving multimedia/notification service data 114 (or notifications) for the one or more applications and/or the operating system that utilize such.

The telecommunications device 102 may register with the session controller 112 for push/poll notification sessions. The session controller 112 may provide push/poll session information such as, but not limited to, a push/poll session ID, application ID, and notification listener address for the telecommunications device 102. The session controller 112 may provide the push/poll session information to the telecommunications device 102 and to other upstream units (e.g., the multimedia/notification service servers 106, the push notification service server 108 and/or the storage system 110). In some embodiments, the session controller 112 may provide the push/poll session information to the telecommunications device 102 which may then provide the push/poll session information other upstream units (e.g., the multimedia/notification service servers 106, the push notification service server 108 and/or the storage system 110).

In other embodiments, the telecommunications device 102 may register with any one of the upstream units (e.g., the push notification service server 108) for push/poll notification sessions, which may then provide push/poll session information to the telecommunications device 102 and/or to the other upstream units. In some instances, the telecommunications device 102 may provide push/poll session information to upstream units (e.g., the multimedia/notification service servers 106, the push notification service server 108 and/or the storage system 110).

The multimedia/notification service servers 106 may be any server or computing device configured to provide multimedia/notification service data 114 for applications and/or operating systems that utilize notifications. The multimedia/notification service servers 106 may provide the multimedia/notification service data 114 to the telecommunications device 102 and/or the push notification service server 108 and/or the storage system 114.

The push notification service server 108 may be any server or computing device configured to provide multimedia/notification service data 114, or push notifications, to the telecommunications device 102 via the communications connection 116. The communications connection 116, which may pass, at least in part, through a portion of a telecommunications system (e.g., a base station and/or an access network) of network(s) 104 may be a persistent communications connection. To keep the communications connection 116 open, the push notification service server 108 may provide downstream messages 118, which may include a "keep alive" connection message, to the telecommunications device 102, and the telecommunications device 102 may provide upstream messages 120, which may include an acknowledgment message, to the push notification service server 108. However, in other embodiments, the telecommunications device 102 may provide the heartbeat messages via the upstream messages 120, and the push notification service server 108 may provide the acknowledgment messages via the downstream messages 118. In some embodiments, the heart rate of the communications connection 116, which may also be referred to as the network heart rate, may be determined by network settings such as, for example, gateway router settings in network(s) 104 and a minimum expiration time of (transmission control protocol/user datagram protocol) TCP/UDP session in routers. However, in some instances, the actual rate of the heart beat may be determined to be the minimum of the network heart rate and the application service interval or batch interval. In some instances, the push notification service server 108 may take multimedia/notification service data 114 for different applications and/or operating system features and transmit or push them together as a batch when a periodic batch interval timer expires. In some instances, the push notification service server 108 may take multimedia/notification service data 114 for different applications and/or operating system features and transmit or push them separately when their respective application service interval timer expires. For the purposes of this disclosure, an application service interval is an amount of time between notifications for an application or operating system that requests or requires notification functionality, and a batch interval corresponds to the minimum application service interval when multimedia/notification service data 114 for different applications and/or operating system features are batched together.

The telecommunications device 102 may elect to receive the multimedia/notification service data 114 from the push notification service server 108 or to retrieve the multimedia/notification service data 114 from either the multimedia/notification service servers 106 or the storage system 110. The telecommunications device 102 may calculate an energy efficiency indicator that may be indicative of an estimated energy consumption rate for receiving the multimedia/notification service data 114 from the push notification service server 108 and for retrieving the multimedia/notification service data 114 from either the multimedia/notification service servers 106 or the storage system 110 and may select a source of the multimedia/notification service data 114 based at least in part on the estimated energy consumption rates.

In some instances, the telecommunications device 102 may pull the multimedia/notification service data 114 rather than receiving the multimedia/notification service data 114 as pushes from the push notification service server 108. In such instances, the telecommunications device 102 may terminate the communications connection 116 and pull the multimedia/notification service data 114 from either one, or both, of the multimedia/notification service servers 106 and the storage system 110. The telecommunications device 102 may send an upstream message 120 that polls the multimedia/notification service servers 106 and/or the storage system 110 for multimedia/notification service data 114, and the multimedia/notification service servers 106 and/or the storage system 120 may provide the multimedia/notification service data 114, via one or more downstream messages 118, to the telecommunications device 102.

The telecommunications device 102 may be capable of selecting a source (e.g., multimedia/notification service servers 106, push notification service server 108, and/or storage system 110) for multimedia/notification service data 114. In some embodiments, the telecommunications device 102 may calculate an energy efficiency indicator that may be indicative of an amount of energy that the telecommunications device 102 may consume in receiving multimedia/notification service data 114 from the various sources (e.g., multimedia/notification service servers 106, push notification service server 108, and/or storage system 110) and may select the source based at least in part on energy efficiency (e.g., the source that is most energy efficient). The telecommunications device 102 may also be capable of terminating the communications connection 116 when the push notification service server 108 is not selected as the source of multimedia/notification service data 114.

In some embodiments, the telecommunications device 102 may re-select the source for multimedia/notification service data 114. In some instances, the telecommunications device 102 may re-select, from time to time, the source for multimedia/notification service data 114 based at least in part on temporal considerations (e.g., whether a threshold amount of time has elapsed since the most immediate prior selection of the current source). In some instances, the telecommunications device 102 may re-select the source for multimedia/notification service data 114 based at least in part on non-temporal considerations (e.g., whether the telecommunications device 102 is currently within a predetermined region that contains a location where the telecommunications device 102 was during the most immediate prior selection of the current source). In some instances, the telecommunications device 102 may re-select the source for multimedia/notification service data 114 based at least in part on network considerations (e.g., whether the telecommunications device 102 is currently communicating with the same base station as it was during the most immediate prior selection of the current source).

The network(s) 104 is representative of any one or combination of multiple different types of networks, interconnected with each other and functioning as a single large network (e.g., circuit-switched telephone networks or IP-based packet-switch networks). The network(s) 104 may also include wire-based networks (e.g., PSTN, IP-based, etc.) and wireless networks (e.g., cellular, satellite, IP-based, etc.).

The network(s) 104 may use any number of protocols and configurations to enable the telecommunications device 102 to access other devices and resources. The network 104 may be, for example, an access network, which may include several types of circuit-switched telephone networks, such as Public Switched Telephone Network (PSTN) and packet-switched networks, such as the Internet. For example, the network 104 may include a Global System for Mobile Communication (GSM) network, a Code Division Multiple Access (CDMA) network, an Enhanced Data Rates for GSM Evolution (EDGE) network, a Universal Telecommunications System (UMTS) network and/or other types of circuit-switched networks, a Long Term Evolution (LTE) network, a Worldwide Interoperability for Microwave Access (WiMAX) network, the Internet, and/or other packet-switched networks. The network 104 may also include private networks such as a mobile telephone operator's networks which may use proprietary systems or protocols that are different from the systems or protocols implemented on public networks.

In the case of wireless networks, the network 104 may include one or more base stations, NodeBs, and eNodeBs (referred to herein as "base stations"). Each base station may include a base station antenna and a base station controller or radio network controller (referred to herein as "base station controller"). In networks 104 that provide LTE connections, the base station controller functionality may be distributed between an eNodeB and a mobility management entity or serving gateway of a core network. Thus, while the base station controller is discussed throughout as being part of a base station, it is to be understood that part of the base station controller may be distributed between a base station of an access network and a core network connected to the access network. The base station controller may, among other things, schedule network resource allocations. The base station antenna may transmit/receive wireless signals to/from the telecommunications device 102. The network 104 may provide, among other things, wireless connectivity with the telecommunications device 102.

The network 104 may also include one or more access network gateways (AN-Gateways). The AN-Gateway may, among other things, provide and establish connectivity with a connectivity network (also referred to as a "core network"). The connectivity network may be responsible for establishing connectivity with an IP backbone and may include one or more servers, which may include Dynamic Host Configuration Protocol (DHCP) servers, Domain Name System (DNS) servers, and Authentication, Authorization, and Accounting (AAA) servers.

The storage system 110 may include multiple distributed storage servers 122 networked together. Data, including multimedia/notification service data 114, may be stored on multiple storage servers 120, rather than being hosted on dedicated servers. In some instances, the storage system 110 may be a cloud storage system in which cloud storage services may be accessed through a web service application programming interface (API), or through a Web-based user interface.

Example Computing Device

Figure 2:
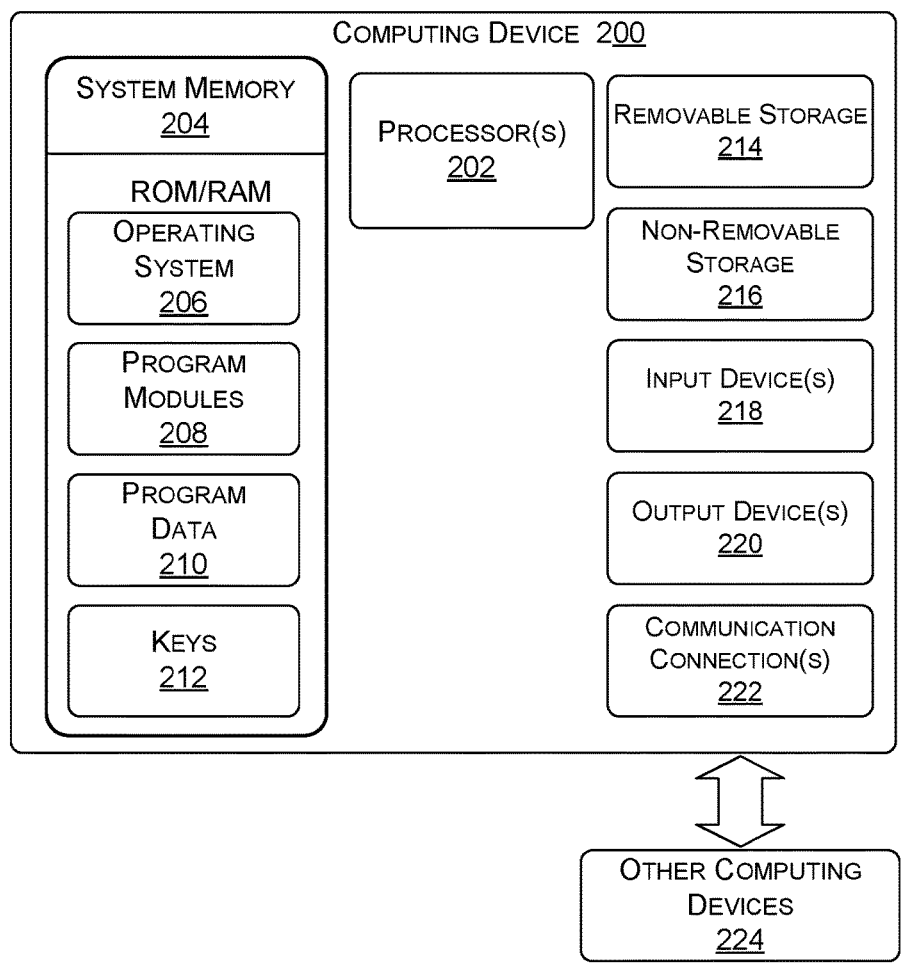
FIG. 2 is a block diagram showing various components of an illustrative computing device.

FIG. 2 shows an illustrative computing device 200 that may be used as a server (e.g., multimedia/notification service server 106, push notification service server 108, storage server 122). It will readily be appreciated that the various embodiments described above may be implemented in other computing devices, systems, and environments. The computing device 200 shown in FIG. 2 is only one example of a computing device and is not intended to suggest any limitation as to the scope of use or functionality of the computer and network architectures. The computing device 200 is not intended to be interpreted as having any dependency or requirement relating to any one or combination of components illustrated in the example computing device.

In a very basic configuration, the computing device 200 typically includes at least one processing unit 202 and system memory 204. Depending on the exact configuration and type of computing device, the system memory 204 may be volatile (such as RAM), non-volatile (such as ROM, flash memory, etc.) or some combination of the two. The system memory 204 typically includes an operating system 206, one or more program modules 208, program data 210, and may include keys 212. The program modules 208 may include push and/or pulling modules. Among other things, the push and/or pulling modules facilitate distribution of multimedia/notification service data 114 among the upstream units. The keys 212 may include security keys and a private/public key pair, such as keys employed in asymmetric cryptography, belonging to the computing device 200 and may include other public keys that may belong to other devices.

The computing device 200 may have additional features or functionality. For example, the computing device 200 may also include additional data storage devices (removable and/or non-removable) such as, for example, magnetic disks, optical disks, or tape. Such additional storage is illustrated in FIG. 2 by removable storage 214 and non-removable storage 216. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 204, the removable storage 214 and the non-removable storage 216 are all examples of computer storage media. Computer storage media includes, but is not limited to, random access memory (RAM), read only memory (ROM), electrically erasable programmable read only memory (EEPROM), flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 200. Any such computer storage media may be part of the computing device 200. Moreover, the computer-readable media may include computer-executable instructions that, when executed by the processor(s) 202, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 200 may also have input device(s) 218 such as keyboard, mouse, pen, voice input device, touch input device, etc. Output device(s) 220 such as a display, speakers, printer, etc. may also be included. These devices are well known in the art and are not discussed at length here.

The computing device 200 may also contain communication connections 222 that allow the device to communicate with other computing devices 224 and/or with the telecommunications device 102, such as over a network. These networks may include wired networks as well as wireless networks.

It is appreciated that the illustrated computing device 200 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like. For example, some or all of the components of the computing device 200 may be implemented in a cloud computing environment, such that resources and/or services are made available via a network for selective use by the telecommunications device 102.

Example Telecommunications Device

Figure 3:
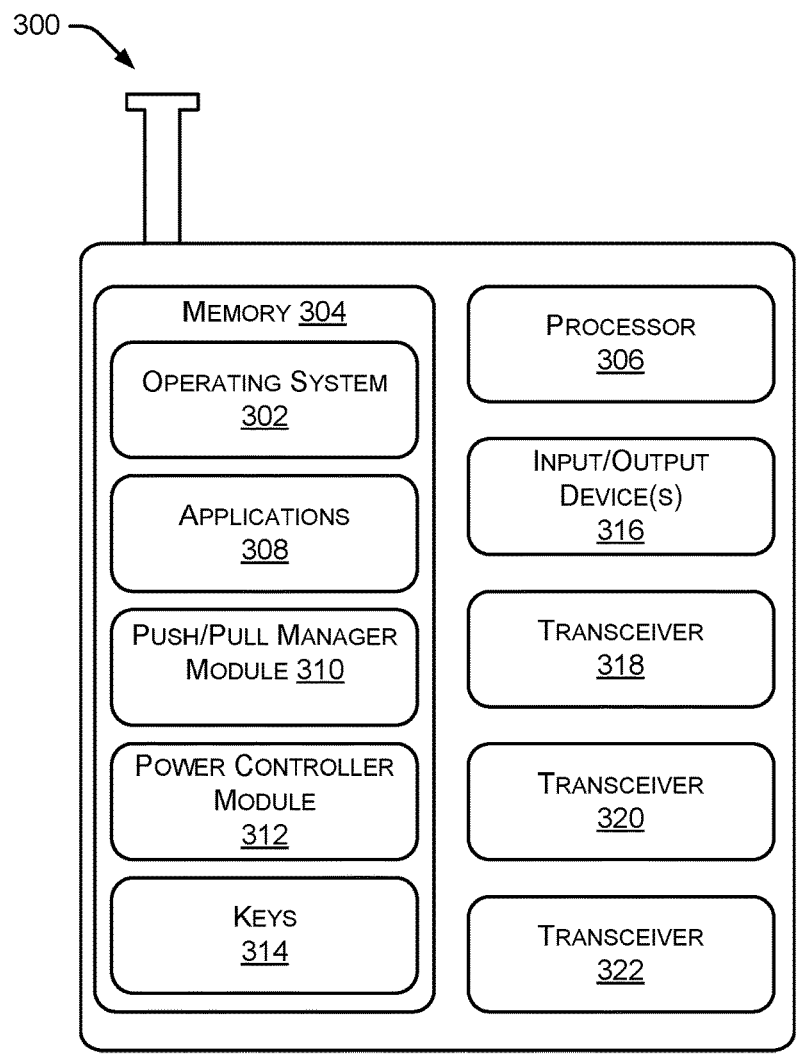
FIG. 3 is a block diagram showing various components of an illustrative telecommunications device shown in FIG. 1.

FIG. 3 shows a telecommunications device 300 such as might be used in conjunction with the techniques described here. In many cases, telecommunications device 300 will be what is commonly referred to as a "cell phone," although the described techniques can be used in conjunction with any telecommunications device.

The telecommunications device 300 typically has an operating system 302 executed from some form of solid-state memory 304 by one or more processors 306. The operating system 302 may include features such as tiles that utilize notifications.

Applications 308, push/pull manager module 310, power controller module 312, and keys 314 may also be stored in memory 304. Applications 308 may include custom software, which may be preloaded onto the device to perform various functions and to support the different communication modes described above, and third-party software. Non-limiting examples of applications 312 include e-mail, instant messaging, and other applications that utilize notifications.

The push/pull manager module 310 may perform various functions and support push/pull sessions. Among other things, the push/pull manager module 310 may initiate and terminate push/pull sessions, select (and re-select) one or more communications channels for a push/pull session. The power controller module 312 which may, among other things, determine energy efficiencies (or energy consumption rates) for various communications channels that may be employed during a push/pull session.

The keys 314 may include security keys and a private/public key pair, such as keys employed in asymmetric cryptography, belonging to the telecommunications device 300 and may include other public keys that may belong to other devices.

The user interfaces of telecommunications devices vary widely. The user interfaces include input/output devices 316. The most basic input/output devices 316 might include a numeric telephone-type keypad, to which has been added "talk" and "end" buttons for controlling voice calls, and a basic output device consisting of a single-line display for indicating telephone numbers. Other input/output devices 316 might include touch-screen interfaces, alpha-numeric keypads, a microphone, and other forms of input devices. Input/output devices 316 may also include display screens, speakers, and other forms of output devices.

The telecommunications device 300 also includes one or more transceivers 318-322. Transceiver 318 may provide a radio interface employed by a cellular communications network for voice and data communications. Transceiver 320 may provide a wireless point-to-point communications interface such as Wireless Fidelity (WiFi) (IEEE 802.11). Transceiver 322 may provide another wireless point-to-point communications interface such as Bluetooth (IEEE 802). Although telecommunications device 300 is illustrated having three transceivers there may be more or fewer transceivers in alternative embodiments. For example, the telecommunications device 300 may include one or more multi-mode transceivers having the functionality of at least two of the transceivers 318-322.

Example Energy Calculations

Energy consumption of the telecommunications device 102 can be divided into two main modes: power saving mode (or sleep state) and working mode. During sleep state, the telecommunications device 102 may turn off some or most its circuits, e.g., turn processor(s) and other chipsets to sleep mode, while maintaining circuitry for listening to connected channel(s) active. The rate of energy consumption in sleep state is a minimum and is denoted as Ps.

When the telecommunications device 102 is in working mode, there are basically three states for energy consumption: idle state, receiving and processing packet state and transmitting and processing packet state having energy consumption rates denoted as $P_I$, $P_R$ and $P_T$, respectively. Among them, energy consumption rate for idle state ($P_I$) is lowest, while the energy consumption rate for transmitting and processing packet state ($P_T$) is highest.

The total energy consumption for data transmission for the telecommunications device 102 during a period T may be expressed as follows:

$$E_{tot\_trans} = P_I*(T*r\% - T_{Tx} - T_{Rx}) + P_T*T_{Tx} + P_R*T_{Rx} + P_S*T*(1-r\%), \quad (1)$$

where r % is the percentage of time for working mode, $T_{Tx}$ is the amount of time for transmitting and processing, and $T_{Rx}$ is the amount of time for receiving and processing.

As an exemplary calculation of energy consumption, consider the following: assume there are L bytes of data to send while the telecommunications device 102 is in the working state, and the packet size of a minimum transmission unit (MTU) frame is B. For a service connection i in the telecommunications device 102, the average throughput of the telecommunications device 102 is assumed as $\tau_i$, the transmission rate of radio interface is assumed as k bytes/s (which is mainly determined by wireless radio interface in the network 104), and it is assumed there are m bytes ACKs packets per n transmitted packets. So the total idle period during transmission period is shown as, $$T_I \approx \min\left(0, \frac{L+O_i}{\tau_i} - \frac{L+O_i}{k} - \frac{L*m}{B*n*k}\right), \quad (2)$$

where $O_i$ is the total overhead for data packet with size L when channel i (e.g., push channel, poll storage system, poll multimedia/notification service servers) is used, which is affected by protocols and connection method used. For example, the overhead of http web service (e.g., in the case of storage system 110 being a cloud storage system) is different from overhead of push channel which is based on persistent TCP connection (e.g., communications connection 116 being a persistent connection).

Therefore, $T_I$ is mainly determined by service speed $\tau_i$ and the delay during packet delivery trip. And in this case, different channel paths affect the length of $T_I$, which affects total power consumption in push/pull notification services.

Specifically, for each type of channel, the rates of energy consumption are different:

Push Channel: In the following discussion, the communications connection 116 is assumed to be a persistent communications connection, and therefore, in addition to energy consumption for data transmission, the telecommunications device 102 also needs to send one-trip KeepAlive packets to push notification service server 108 to keep the communications connection 116 alive through the network 104. So the total energy consumption, given a period T, is as follows:

$$E_{tot\_push} = E_{tot\_trans} + E_{tot\_keep} * \frac{T}{T_K} + d\% * E_{tot\_pushSetup}, \quad (3)$$

where $T_K$ is the period length for a connection (e.g., transmission control protocol (TCP) or user datagram protocol (UDP)) to transmit KeepAlive signaling to refresh the communications connection 116, d % is the dropping probability of the communications connection 116 during time period T so that Push Channel Setup is executed during the period T.

The calculation of $E_{tot\_keep}$ is similar to $E_{tot\_trans}$, but there is no ACK packets needed in sending KeepAlive packets (since it is one-trip sending).

Storage System Channel: The telecommunications device 102 polls and gets data from storage system 110. Consequently, the energy consumption of the telecommunications device 102 may be expressed as $$E_{tot\_trans} E_{tot\_pollrequest}. \quad (4)$$

Notification service server(s) Channel: Since mobile device polls and gets data from each notification service server directly, its energy consumption can be expressed as $$\Sigma_i(E_{tot_{trans}}(i) + E_{tot_{pollrequest}}(i)), \quad (5)$$

where i an index of multimedia/notification service servers 106 that are polled.

The total energy consumption in each of the channels can be expressed as:

$$\text{Avg\_}P_p*(\text{Source Data+Signaling Data+Overhead Data}) + P_I*T_I, \quad (6)$$

where $\text{Avg\_}P_p$ is the average energy for data packet per byte transmission (transmitting & receiving).

Example Processes

FIGS. 4-7 shows processes 400-700, respectively, that may be implemented in accordance with the present disclosure. Processes 400-700 are illustrated as a collection of referenced acts arranged in a logical flow graph, which represent a sequence that can be implemented in hardware, software, or a combination thereof. In the context of software, the acts represent computer-executable instructions that, when executed by one or more processors, perform the recited operations. Generally, computer-executable instructions include routines, programs, objects, components, data structures, and the like that perform particular functions or implement particular abstract data types. The order in which the acts are described is not intended to be construed as a limitation, and any number of the described acts can be omitted or combined, in any order and/or in parallel, to implement the processes.

Figure 4:
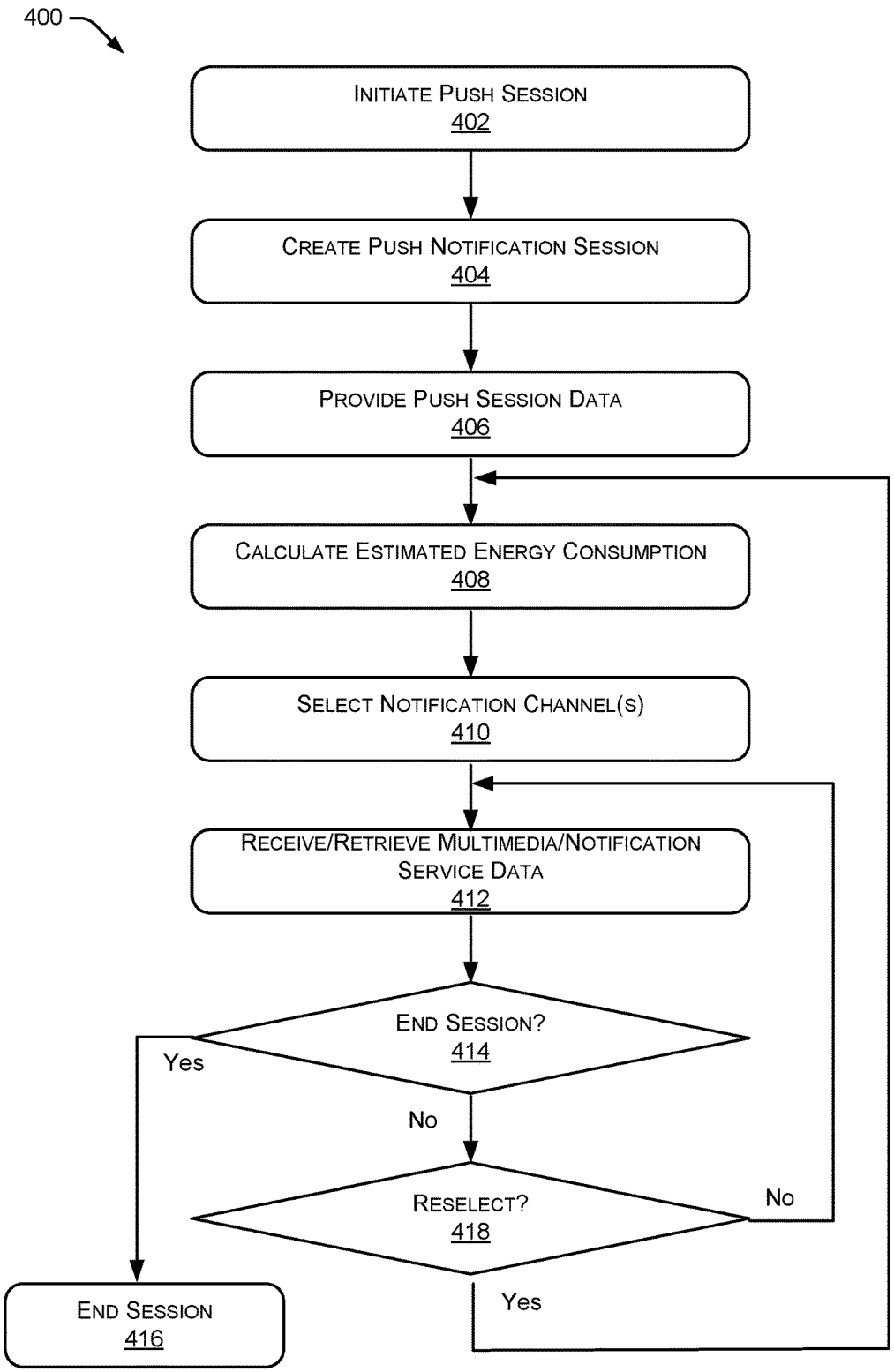
FIG. 4 is a flow diagram of a process for managing a push/poll notification session.

FIG. 4 shows a process 400 for managing a push/pull notification session.

At 402, the telecommunications device 102 initiates a push/pull notification session. The telecommunications device 102 may initiate the push/pull notification session by sending a request, via upstream message 120, to an upstream unit such as the push notification service server 108.

At 404, the push notification service server 108 may create a push notification session, which is typically persistent, and may register application(s) for which push notification service is requested. The push notification service server 108 may send back, via downstream message 118, push/pull session information such as, but not limited to, a push/pull session ID, application ID, and notification listener address to the telecommunications device 102.

At 406, the telecommunications device 102 and/or the push notification service server 108 may provide the multimedia/notification service servers 106 and/or the storage system 110 with push/pull session information, e.g., the push/pull session ID, application ID, and the notification listener address, for notification channel registration. Typically, the push/pull session information may be provided to one or more of the multimedia/notification service servers 106 that correspond to the application ID. In some instances, the multimedia/notification service servers 106 may provide multimedia/notification service data 114 to the storage system 110.

At 408, the telecommunications device 102 may calculate an energy efficiency indicator that may be indicative of an estimated energy efficiency rate or an energy consumption rate for the amount of energy required for receiving/retrieving n multimedia/notification service data 114 from each source of multimedia/notification service data 114 over each notification channel available at the telecommunications device 102. In some embodiments, the telecommunications device 102 may have multiple communications interfaces for communicating over different communications channels, e.g., a first communications interface for a cellular network (e.g., a radio interface for a wireless telephonic network) and a second communications interface for wireless point-to-point communications (e.g., Wireless Fidelity (WiFi) (IEEE 802.11) or Bluetooth (IEEE 802.15)). In such situations, the telecommunications device 102 may calculate the estimated energy consumption rates for receiving/retrieving the multimedia/notification service data 114, over each of the multiple communications interfaces, from the multimedia/notification service servers 106, the push notification service server 108, and the storage system 110.

At 410, the telecommunications device 102 may select a notification channel (or channels). In some instances, the selected notification channel may be a push notification channel such as when the push notification service server 108 is selected to be the source of multimedia/notification service data 114. In other instances, the selected notification channel may be a pull notification channel such as when the telecommunications device 102 selects the multimedia/notification service servers 106 and/or the storage system 110 to be the source of multimedia/notification service data 114, and in such instances, the telecommunications device 102 polls the multimedia/notification service servers 106 and/or the storage system 110. In situations in which the telecommunications device 102 has multiple communications interfaces, the telecommunications device 102 may select not only the upstream source (e.g., multimedia/notification service servers 106, push notification service server 108, and/or storage system 110) of the multimedia/notification service data 114 but may also select one (or more) of the communications interfaces.

The telecommunications device 102 may select the desired notification channel based at least in part on the estimated energy efficiency or estimated energy consumption rates of the notification channels. The telecommunications device 102 may notify the multimedia/notification service servers 106 and/or the push notification service server 108 and/or the storage system 110 of the selected upstream source for the multimedia/notification service data 114. Any one of the upstream units (i.e., multimedia/notification service servers 106, push notification service server 108 and storage system 110) may notify any other upstream unit of the selected source for the multimedia/notification service data 114. The multimedia/notification service servers 106 may, if necessary, provide the multimedia/notification service data 114 to the selected source (i.e., the push notification service server 108 and/or the storage system 110). If the telecommunications device 102 did not select the push notification service server 108 as the source for multimedia/notification service data 114, the communications connection 116 may be terminated.

At 412, the telecommunications device 102 may receive/retrieve multimedia/notification service data 114 via the selected communications interface(s). The telecommunications device 102 may, if necessary, poll, via the desired communications interface, the selected upstream source of the multimedia/notification service data 114. Sometimes, the telecommunications device 102 may be receiving multimedia/notification service data 114 for multiple applications (e.g., e-mail and instant messaging) and/or operating system features. In some instances, the telecommunications device 102 may select different notification channels for the respective applications and/or operating system features. For example, the telecommunications device 102 may select the storage system 110 to be the source of multimedia/notification service data 114 for one application (e.g., e-mail) and select the multimedia/notification service server(s) 106 to be the source of multimedia/notification service data 114 for another application (e.g., instant messaging). In other instances, the telecommunications device 102 may receive the multimedia/notification service data 114 for the multiple applications and/or operating system features in batches from the push service server 108 or may retrieve, in batches, the multimedia/notification service data 114 for the multiple applications and/or operating system features from the storage system 110.

At 414, the telecommunications device 102 may determine whether to end the push/pull notification session. If affirmative, the process continues at 416, where the push/pull notification session is terminated. If negative, the process continues at 418, where the telecommunications device 102 determines whether to reselect a notification channel. In some embodiments, the telecommunications device 102 may determine whether to reselect a notification channel based at least in part on temporal considerations (e.g., whether a threshold amount of time has elapsed since the current notification channel was selected) or network considerations (whether the telecommunications device 102 is currently communicating with the same base station or same point-to-point station as it was during the most immediate prior selection of the current source).

If affirmative, the process returns to 408, and if negative, the process returns to 412.

Figure 5:
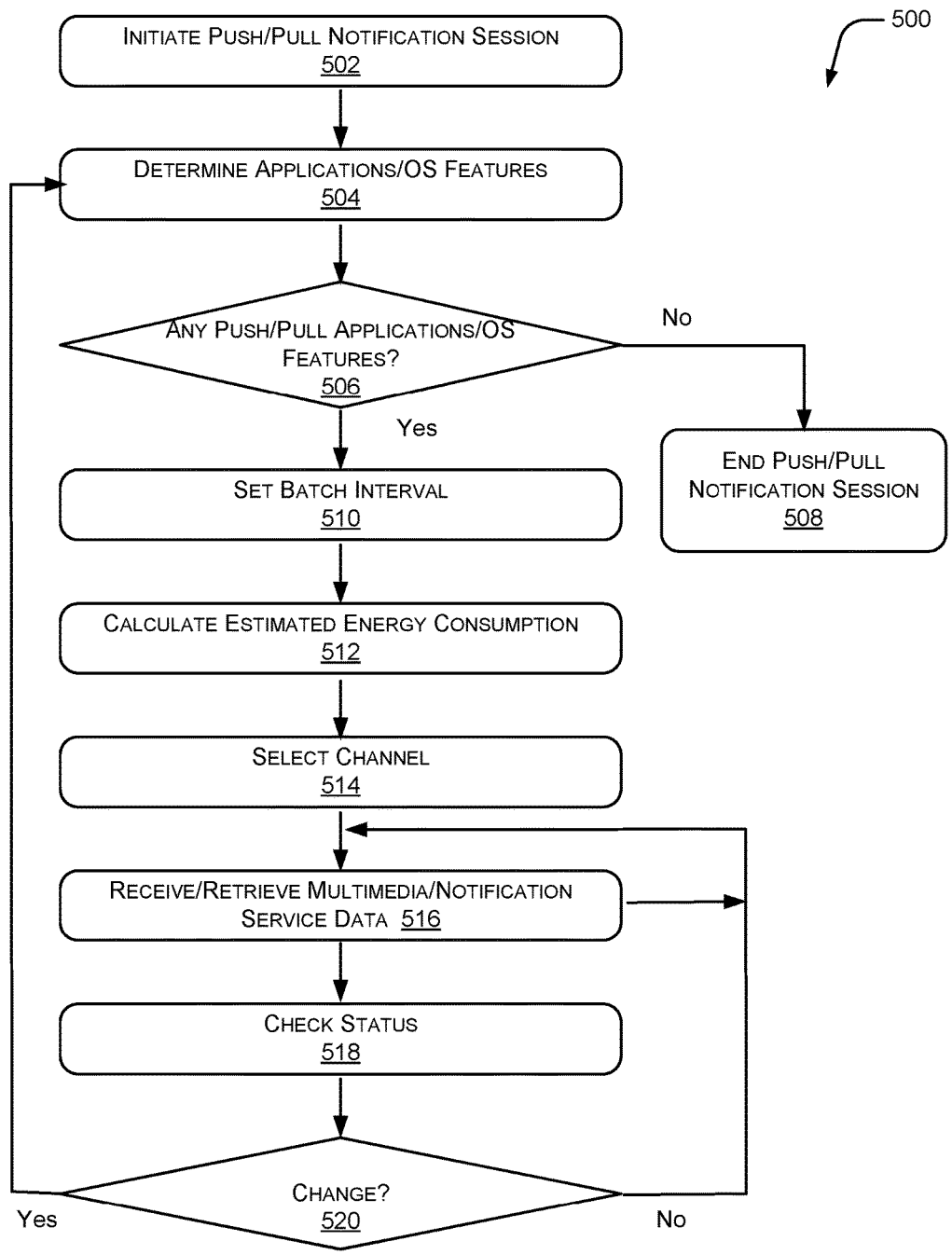
FIG. 5 is a flow diagram of another process for managing a push/poll notification session.

FIG. 5 shows another process 500 for managing a push/pull notification session.

At 502, a push/pull notification service is initiated. The telecommunications device 102 may initiate the push/pull notification session by sending a request, via upstream message 120, to an upstream unit such as, but not limited to, the push notification service server 108 or the session controller 112. The initiation of the push/pull notification session may be in response to a user activating an application (e.g., e-mail) that employs push/pull notifications. The telecommunications device 102 may receive push/pull session information such as, but not limited to, a push/pull session ID, application ID, and notification listener address.

At 504, the telecommunications device 102 may determine which applications and/or operating system features are executing on one or more tasks, jobs, fibers, threads, and/or processes, foreground and/or background, on the telecommunications device 102. For example, the telecommunications device 102 may determine that an e-mail application is executing on the telecommunications device and/or that the operating system includes a graphical user interface having push notification functionality (e.g., tiles).

At 506, the telecommunications device 102 may determine whether any of the applications and/or operating system features, currently executing, at the telecommunications device 102 require/request push/pull notifications. Applications and/or operating system features that require or request push/pull notifications may also be referred to as notification consumers. If negative, the process continues at 508, where the push/pull notification session is terminated. If affirmative, the process continues to 510.

At 510, the telecommunications device 102 may set a batch interval for the push/pull notification session. Assuming that there is more than one application/operating system feature requesting push/pull notifications, the batch interval may be the minimum application service interval for any one of the applications/operating system features, currently executing, at the telecommunications device 102 that request push/pull notifications. Assuming that there is only one application/operating system feature requesting push/pull notifications, the batch interval may be the application service interval for the application/operating system feature.

At 512, the telecommunications device 102 calculates an energy efficiency indicator that may be indicative of an estimated energy efficiency (and/or an estimated energy consumption) for push/pull communications channels between the telecommunications device 102 and each source (e.g., multimedia/notification service servers 106, push notification service server 108, and/or storage system 110) for multimedia/notification service data 114 over each of the communications interfaces of the telecommunications device 102.

At 514, the telecommunications device 102 selects a current push/pull communications channel for the push/pull notification session. The telecommunications device 102 may select the current push/pull communications channel based at least in part on a determination of which push/pull communication channel had the highest estimated energy efficiency (and/or the lowest estimated energy consumption).

At 516, the telecommunications device 102 may receive/retrieve the multimedia/notification service data 114 via the selected communications channel. When the telecommunications device 102 selects the push notification service server 108 as the source of multimedia/notification service data 114, then the telecommunications device 102 receives the multimedia/notification service data 114 as pushes from the push notification service server 108. However, when the telecommunications device 102 does not select the push notification service server 108 as the source of multimedia/notification service data 114, then the telecommunications device 102 may poll the selected source(s) (either the multimedia/notification service servers 106 and/or the storage system 110) for the multimedia/notification service data 114. The telecommunications device 102 may poll the selected source(s) in accordance with the batch interval.

At 518, the telecommunications device 102 may check the status of the telecommunications device 102. The telecommunications device 102 may check, among other things, the location of the telecommunications device 102 or the identity of a network device (e.g., base station or point-to-point communications device) with which the telecommunications device is communicating.

At 520, the telecommunications device 102 may determine whether there has been a change in status of the telecommunications device 102. If negative, the process returns to 516, and if affirmative, the process returns to 504.

Figure 6:
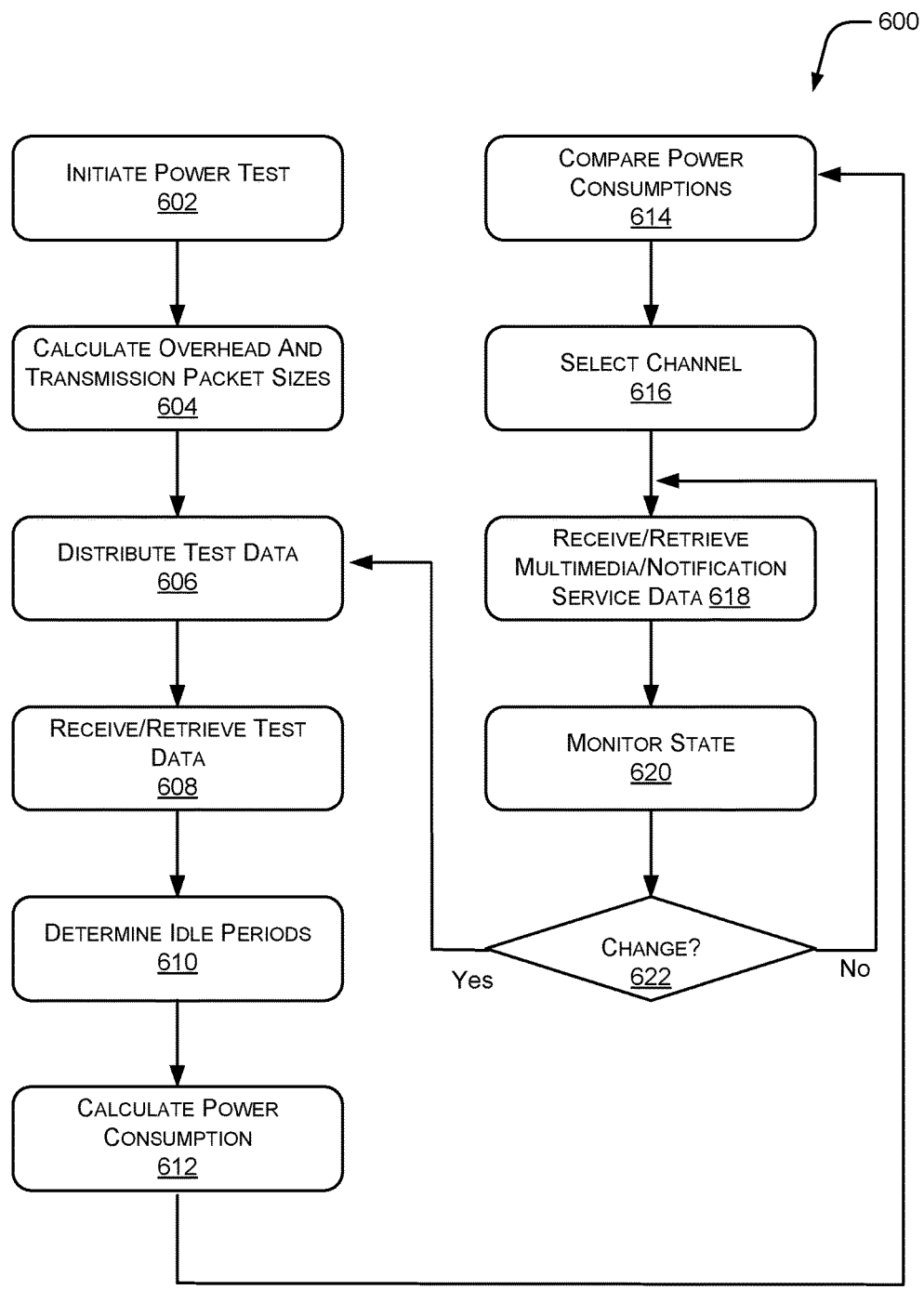
FIG. 6 is a flow diagram of another process for managing a push/poll notification session.

FIG. 6 shows another process 600 for managing a push/pull notification session.

At 602, the telecommunications device 102 may initiate a power test for a push/pull notification session. The telecommunications device 102 may set a unit data packet size (B) as a minimum transmission unit (MTU) and may establish a push notification session with the push notification service server 108.

At 604, the telecommunications device may calculate the overhead packet size for the unit data packet size for pushing the unit data size packet from the push notification service server 108 and for pulling the unit data size packet from the multimedia/notification service servers 106 and from the storage system 110. The telecommunications device may also calculate the transmission packet sizes for the unit data packet size for pushing the unit data size packet from the push notification service server 108 and for pulling the unit data size packet from the multimedia/notification service servers 106 and from the storage system 110. The telecommunications device 102 may perform these calculations for each of its available communications interfaces.

At 606, test data, which may be a unit data packet size, may be distributed. The test data may be distributed to the multimedia/notification service servers 106, the push notification service server 108 and the storage system 110. In some embodiments, the multimedia/notification service servers 106 may distribute the multimedia/notification service data 114, as test data, to both the push notification service server 108 and the storage system 110 by default whenever a push/pull notification session is initiated. In other embodiments, the multimedia/notification service servers 106 may distribute the multimedia/notification service data 114, as test data, to both the push notification service server 108 and the storage system 110 in response to a request, which may come from the telecommunications device 102 and/or the push notification service server 108. In some embodiments, test data may be stored at each of the multimedia/notification service data 114, the push notification service server 108 and the storage system 110.

At 608, the telecommunications device 102 may receive and retrieve the test data. The telecommunications device 102 may receive, over each of its available communications interfaces, pushes of the test data and retrieve (pull), over each of its available communications interfaces, the test data from both of the multimedia/notification service servers 106 and the storage system 110.

At 610, for each of the available communications interfaces of the telecommunications device 102 and for each source of the test data, the telecommunications device 102 may determine delays or idle periods ($T_I$) in each communication channel.

At 612, for each of the available communications interfaces of the telecommunications device 102 and for each source of the test data, the telecommunications device 102 may calculate energy consumed by retrieving or receiving the test data. The telecommunications device 102 may calculate energy consumed by using equation 6.

At 614, the telecommunications device 102 may compare the calculated amounts of energy consumed.

At 616, the telecommunications device 102 may select a current push/pull communications channel for the push/pull notification session. The telecommunications device 102 may select the current push/pull communications channel based at least in part on a determination of which push/pull communication channel consumed the least amount of energy.

At 618, the telecommunications device 102 may receive/ retrieve the multimedia/notification service data 114 via the selected communications channel. When the telecommunications device 102 selects the push notification service server 108 as the source of multimedia/notification service data 114, then the telecommunications device 102 receives the multimedia/notification service data 114 as pushes from the push notification service server 108. However, when the telecommunications device 102 does not select the push notification service server 108 as the source of multimedia/ notification service data 114, then the telecommunications device 102 may poll the selected source(s) (either the multimedia/notification service servers 106 and/or the storage system 110) for the multimedia/notification service data 114. The telecommunications device 102 may poll the selected source(s) in accordance with a batch interval.

At 620, the telecommunications device 102 may monitor the state of the telecommunications device 102. The telecommunications device 102 may monitor, among other things, the location of the telecommunications device 102, the identity of a network device (e.g., base station or point-to-point communications device) with which the telecommunications device is communicating, and/or delays in the current communication channel.

At 622, the telecommunications device 102 may determine whether there has been a change in a state of the telecommunications device 102 or whether a change in a state exceeds a threshold amount, e.g., whether delays in the current communication channel have increased by a threshold amount. If negative, the process returns to 618, and if affirmative, the process returns to 606.

Security

In some embodiments, the storage system 110 may provide HTTP service for data upload or download. To protect user data security and integrity, the storage system 110 may provide a security key to users for authentication and identity checking. For example, the storage system 110 may assign the push notification service server 108 with a security key that may be used when the push notification service server 108 uploads, downloads or updates its data in the storage system 110. Similarly, the storage system 110 may assign the multimedia/notification service servers 106 with another security key (or security keys) that may be used when the multimedia/notification service servers 106 uploads, downloads or updates its data in the storage system 110. In such embodiments, the telecommunications device 102 will need the security key (or security keys) from the storage system 110 to access the multimedia/notification service data 114 at the storage system 110.

The security keys may be safely distributed by employing asymmetric cryptography (e.g., public key encryption/private key decryption) such as that employed by the RSA algorithm. In some embodiments, the telecommunications device 102, multimedia/notification service servers 106, push notification service server 108, and storage system 110 may each have public keys belong to the others. In other embodiments, one or more of the telecommunications device 102, multimedia/notification service servers 106, push notification service server 108, and storage system 110 may have less that all of the public keys of the others. For example, the push notification service server 108 may be the only upstream unit having the public key of the telecommunications device 102, and in such case, the push notification service server 108 may use may use the public key of the telecommunications device 102 as a proxy for other upstream units. The security keys may be safely transmitted between one device and another by the sender encrypting the security key(s) using the public key of the recipient, transmitting the encrypted security key(s) to the recipient, and the recipient decrypting the encrypted security key(s) using its private key.

Figure 7:
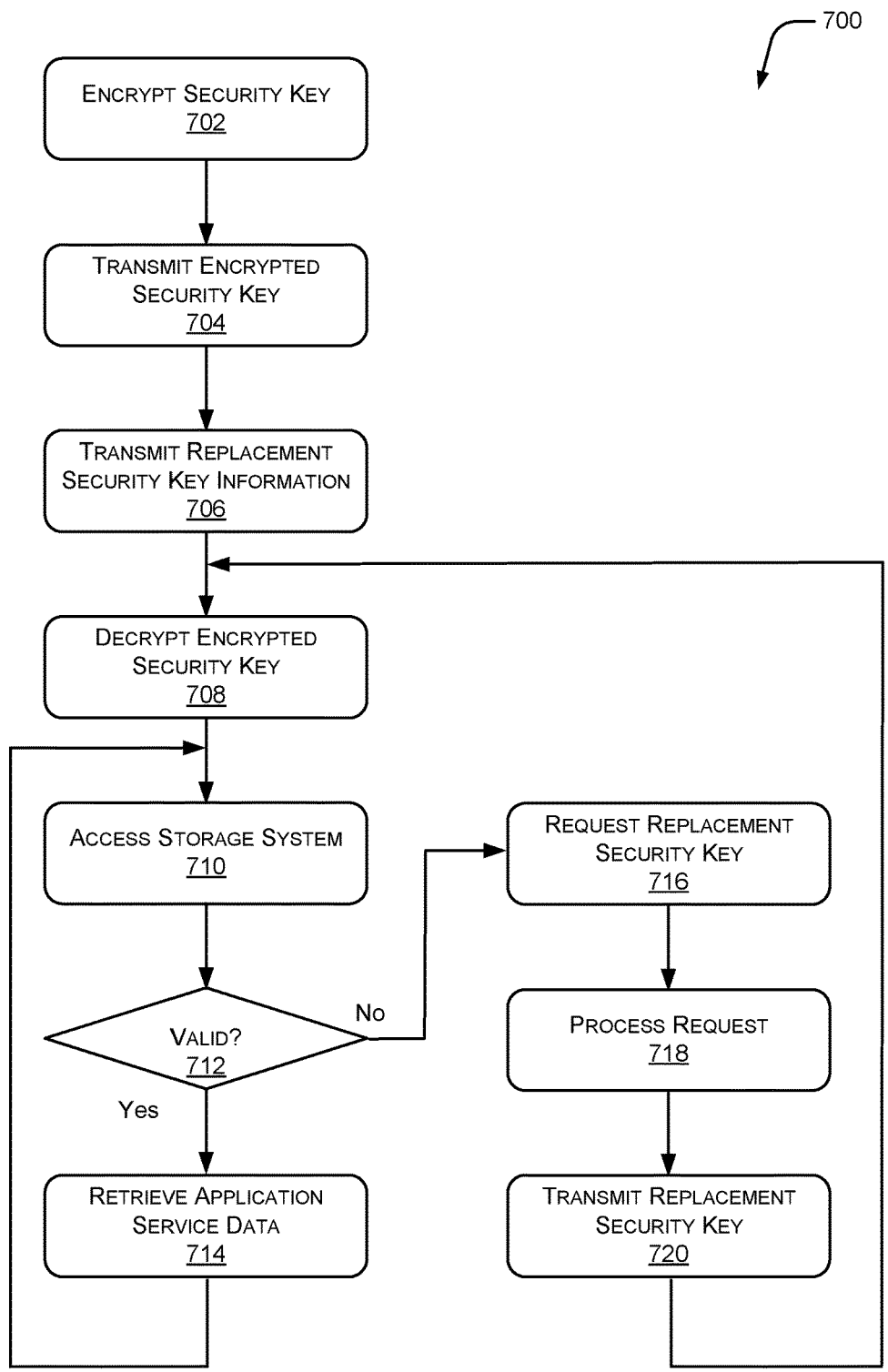
FIG. 7 is a flow diagram of a process for polling multimedia/notification service data from a storage system.

FIG. 7 shows a process 700 for pulling multimedia/ notification service data 114 from the storage system 110. The process 700 is illustrated as a collection of referenced acts arranged in a logical flow graph, which represent a sequence that can be implemented in hardware, software, or a combination thereof. In the context of software, the acts represent computer-executable instructions that, when executed by one or more processors, perform the recited operations. Generally, computer-executable instructions include routines, programs, objects, components, data structures, and the like that perform particular functions or implement particular abstract data types. The order in which the acts are described is not intended to be construed as a limitation, and any number of the described acts can be omitted or combined, in any order and/or in parallel, to implement the processes.

At 702, the security key provided by the storage system 110 may be encrypted by an upstream unit (e.g., the multimedia/notification service servers 106, the push notification service server 108 and/or the storage system 110) using the public key of the telecommunications device 102.

At 704, the upstream unit may transmit the encrypted security key to the telecommunications device 102.

At 706, the telecommunications device 102 may decrypt the encrypted security key using its private key.

At 708, the upstream unit may transmit to the telecommunications device 102, via a downstream message 118, replacement security key information such as, but not limited to, an address of an upstream unit (e.g., the multimedia/ notification service servers 106) that may provide replacement security keys. The telecommunications device 102 may need, in the future, a replacement security when the current security key expires and/or when the storage system 110 may updates security keys.

At 710, the telecommunications device 102 utilizes the security key to access the storage system 110.

At 712, the storage system 110 determines whether the security key is valid. If affirmative, the process continues at 714, and if negative, the process continues at 716.

At 714, the telecommunications device 102 may retrieve multimedia/notification service data 114. The process returns to 710 so that the telecommunications device 102 may, in the future, re-access the storage system 110.

At 716, the telecommunications device 102 sends a request, via an upstream message 120, an upstream unit (e.g., the multimedia/notification service servers 106, the push notification service server 108 and/or the storage system 110) for a replacement security key. In some embodiments, the telecommunications device 102 may send the request to one of the multimedia/notification service servers 106, which may be the multimedia/notification service server with which the telecommunications device 102 may communicate at minimum energy consumption rate.

At 718, the request for the replacement security key is processed. Typically, processing the request may involve at least the storage system 110, but may also involve other upstream units. For example, if the upstream unit (e.g., a multimedia/notification service server 106) that received the request is not the security system 110, the upstream unit may request the replacement security key from the security system 110. If the upstream unit (e.g., a multimedia/notification service server 106) that received the request does not have the public key of the telecommunications device 102, the upstream unit (e.g., a multimedia/notification service server 106) may provide the replacement security key to another upstream unit (e.g., the push notification service server 108), which may then encrypt the replacement security key utilizing the public key of the telecommunications device 102. The processing of the request is complete when an upstream unit—such as the upstream unit that received the request (e.g., the multimedia/notification service server)—that is capable of transmitting the encrypted replacement security key to the telecommunications device 102 is in possession of the encrypted replacement security key.

At 720, the encrypted replacement security is transmitted the telecommunications device 102. The process then returns to 708.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable storage media having computer-executable instructions thereon which, when executed by a processor of a telecommunications device, implement operations comprising:
    determining, at the telecommunications device, a respective energy efficiency indicator for each of multiple, different communications channels between the telecommunications device and a corresponding plurality of sources of multimedia/notification service data, wherein the determining comprises:
        estimating a first delay for communications over a communications channel between the telecommunications device and a first source;
        estimating a second delay for communications over a communications channel between the telecommunications device and a second source;
        estimating a third delay for communications over a communications channel between the telecommunications device and a third source; and
        estimating the energy efficiency indicators based at least in part on the first, the second, and the third delays;
    comparing the energy efficiency indicators;
    selecting, at the telecommunications device, one communication channel of the multiple, different communications channels as a notification session channel based at least in part on the comparison of the energy efficiency indicators; and
    acquiring, at the telecommunications device, via the notification session channel, multimedia/notification service data.

2. The one or more non-transitory computer-readable storage media of claim 1, wherein determining an energy efficiency indicator for each of the multiple communications channels between the telecommunications device and the corresponding sources of multimedia/notification service data comprises:
    determining a first energy efficiency indicator for a communications channel between the telecommunications device and the first source;
    determining a second energy efficiency indicator for a communications channel between the telecommunications device and the second source; and
    determining a third energy efficiency indicator for a communications channel between the telecommunications device and the third source.

3. The one or more non-transitory computer-readable storage media of claim 2, wherein comparing the energy efficiency indicators comprises:
    determining either a minimum estimated energy consumption rate or a maximum estimated energy efficiency based at least in part on the first, the second, and the third energy efficiency indicators.

4. The one or more non-transitory computer-readable storage media of claim 1, wherein comparing the energy efficiency indicators comprises:
    determining either a minimum estimated energy consumption rate or a maximum estimated energy efficiency based at least in part on the first, the second, and the third delays.

5. The one or more non-transitory computer-readable storage media of claim 1, the operations further comprising:
    signaling at least one source of multimedia/notification service data of the plurality of sources of multimedia/notification service data to initiate a pull notification session.

6. The one or more non-transitory computer-readable storage media of claim 1, wherein the third source comprises a storage system and acquiring, via the notification session channel, multimedia/notification service data comprises:
    pulling the multimedia/notification service data, via the notification session channel, from the storage system.

7. The one or more non-transitory computer-readable storage media of claim 6, wherein the storage system is a cloud storage system.

8. The one or more non-transitory computer-readable storage media of claim 6, wherein pulling the multimedia/notification service data, via the notification session channel, from the storage system comprises:
    pulling, in a batch, multimedia/notification service data for multiple notification consumers executing at the telecommunications device.

9. The one or more non-transitory computer-readable storage media of claim 1, the operations further comprising:
    determining whether at least one state of the telecommunications device changes;
    re-selecting one communication channel of the multiple communications channels as a new notification session channel based at least in part on determining that at least one state of the telecommunications device has changed.

10. A method implemented on a telecommunications device by a processor configured to execute instructions that, when executed by the processor, direct the telecommunications device to perform acts comprising:
    acquiring multimedia/notification service data from a first source of a plurality of sources of multimedia/notification service data;
    determining, at the telecommunications device, a respective energy efficiency indicator for each of multiple, different communications channels between the telecommunications device and the corresponding plurality of sources of multimedia/notification service data, wherein the determining comprises:
  estimating a first delay for communications over a communications channel between the telecommunications device and the first source;
  estimating a second delay for communications over a communications channel between the telecommunications device and a second source;
  estimating a third delay for communications over a communications channel between the telecommunications device and a third source; and
  estimating the energy efficiency indicators based at least in part on the first, the second, and the third delays;
comparing the energy efficiency indicators; and
acquiring multimedia/notification service data from at least one of the second source or the third source of the plurality of sources of multimedia/notification service data based at least in part on the comparing the energy efficiency indicators.

11. The method of claim 10, wherein the first source comprises a push notification service server and acquiring multimedia/notification service data from the first source of multimedia/notification service data comprises:
  receiving, via a push, the multimedia/notification service data from the push notification service server.

12. The method of claim 11, wherein the second source comprises at least one multimedia/notification service server and the third source comprises a storage system and acquiring multimedia/notification service data from at least one of the second source or the third source comprises:
  retrieving, via a pull, the multimedia/notification service data from at least one of (a) the at least one multimedia/notification service server or (b) the storage system.

13. The method of claim 12, the method further comprising:
  signaling the push notification service server to cause multimedia/notification service data to be stored at the storage system.

14. The method of claim 13, wherein in response to the signal, the push notification service server either (a) forwards multimedia/notification service data to the storage system or (b) signals the one or more at least one multimedia/notification service servers to provide the multimedia/notification service data to the storage system.

15. The method of claim 11, the method further comprising:
  initiating a push session between the telecommunications device and the push notification server, wherein the push notification server pushes the multimedia/notification service data to the telecommunications device in accordance with push session information;
  acquiring, by the telecommunications device, at least a portion of the push session information;
  terminating, after the telecommunications device acquires the at least a portion of the push session information, the push session between the telecommunications device and the push notification server; and
  initiating a pull session between the telecommunications device and at least one of the second source or the third source of multimedia/notification service data based at least in part on the at least a portion of the push session information.

16. The method of claim 10, wherein the second source is at least one multimedia/notification service server and the third source is a storage system.

17. The method of claim 16, wherein the storage system is a cloud storage system.

18. A telecommunications device comprising:
  at least a first transceiver having a first communications interface and a second transceiver having second communications interface that is different from the first communications interface;
  a processor; and
  a memory having instructions stored thereon, the instructions, when executed by the processor, direct the telecommunications device to perform acts comprising:
    for both the first and the second transceivers, determining a respective energy efficiency indicator for each of multiple, different communications channels between the telecommunications device and a corresponding plurality of sources of multimedia/notification service data, wherein determining an energy efficiency indicator for multiple communications channels between the telecommunications device and sources of multimedia/notification service data comprises:
      determining a first energy efficiency indicator for a communications channel, over the first transceiver, between the telecommunications device and a first source of multimedia/notification service data;
      determining a second energy efficiency indicator for a communications channel, over the second transceiver, between the telecommunications device and the first source of multimedia/notification service data;
      determining a third energy efficiency indicator for a communications channel, over the first transceiver, between the telecommunications device and a second source of multimedia/notification service data; and
      determining a fourth energy efficiency indicator for a communications channel, over the second transceiver, between the telecommunications device and the second source of multimedia/notification service data;
    comparing the energy efficiency indicators;
    selecting one communications channel of the multiple, different communications channels as a notification session channel based at least in part on the comparison of the energy efficiency indicators; and
    acquiring, via the notification session channel, multimedia/notification service data.

19. The telecommunications device of claim 18, wherein the first communications interface of the first transceiver is a radio interface employed by a cellular communications network.

20. The telecommunications device of claim 18, wherein the second communications interface of the second transceiver is a point-to-point communications interface.

* * * * *